Patented Feb. 28, 1939

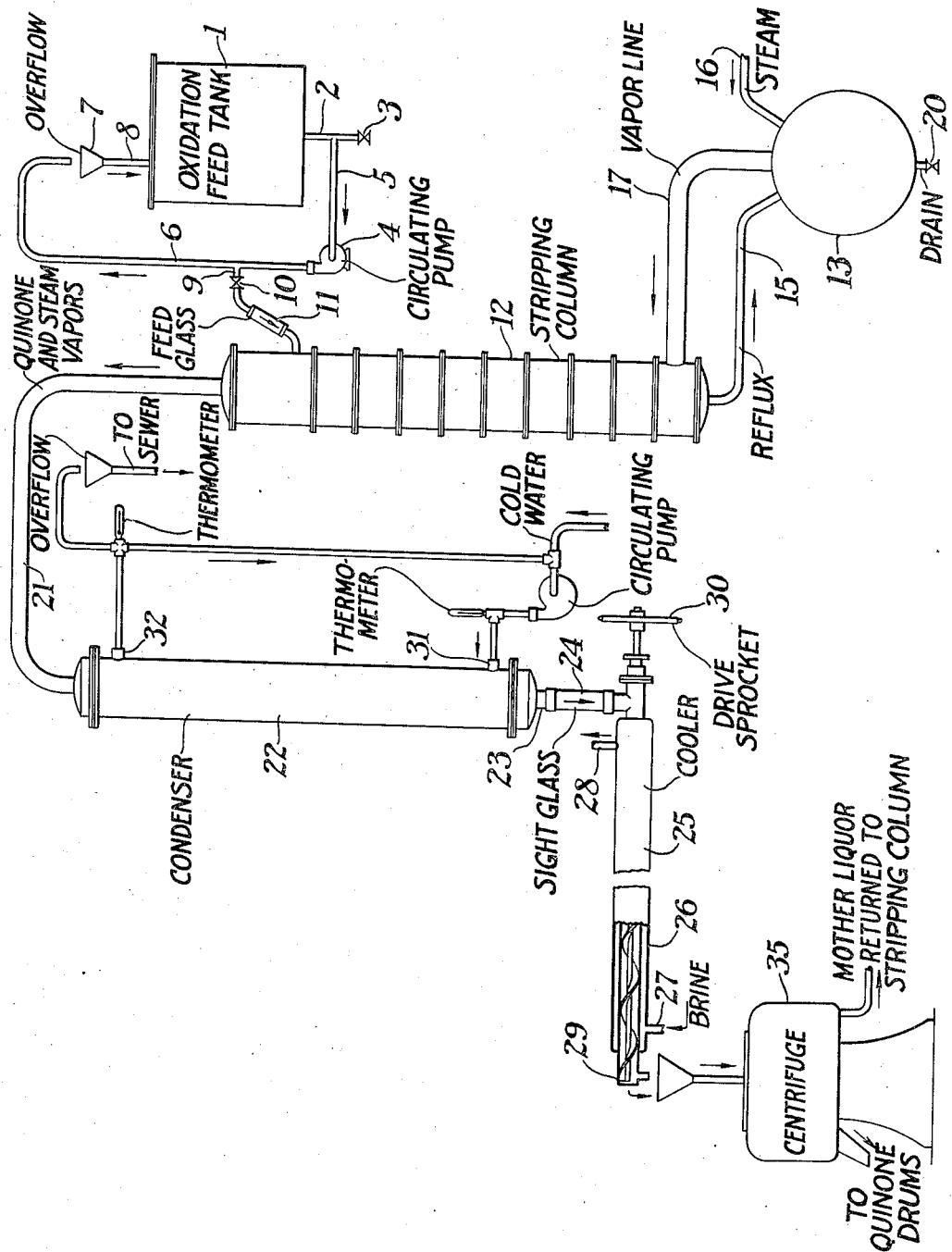

2,148,669

UNITED STATES PATENT OFFICE 2,148,669

PURIFICATION OF QUINONE

John W. Zabriskie, Kingsport, Tenn., assignor, by mesne assignments, to Eastman Kodak Company, Jersey City, N. J., a corporation of New Jersey Application August 7, 1936, Serial No. 94,836

7 Claims. (Cl. 260—396)

This invention pertains to the purification of quinone and, particularly, quinones by steam distillation.

Quinones are generally produced by oxidation of various benzene derivatives usually by electrolytic, catalytic or chemical oxidation. In such processes the quinone is obtained in impure form dispersed in the crude reaction mixture and must be separated therefrom and purified before suitable for use. Purification has been effected by steam distillation, either at ordinary or reduced pressure, or by ordinary distillation especially at reduced pressure. These types of purification processes have been generally unsatisfactory due to the fact that quinone is a solid at ordinary temperatures and is practically insoluble in cold water. When distilling the substance in order to purify it using either of the above processes, it has been found that the vaporized quinone solidifies in the condenser coating the walls with a solid scale which prevents effective condensation and causes clogging of the apparatus necessitating periodic cleaning and exposure of personnel to the harmful action of the quinone. Due to the inefficient condensing action much of the quinone is kept at an elevated temperature for a rather prolonged period of time causing substantial thermal decomposition.

This invention has for its object to overcome the above deficiencies of hitherto known processes for the purification of quinones. Another object is to provide a process of steam distillation of solid organic substances by which troublesome deposition of solids during condensation is avoided. A further object is to provide an improved process for purifying quinone i. e. p-benzoquinone. Another object is to provide a process for purifying quinone by steam distillation whereby a troublesome deposition of solids in the condenser is substantially avoided. Other objects will appear hereinafter.

These objects are accomplished by subjecting the crude mixture containing the solid substance to be purified, such as quinone, to steam distillation and condensing the distillate at a temperature below the boiling point of water, but at a temperature above that at which the quinone crystallizes out of the aqueous condensate, the warm or hot condensate then being conducted to a cooling zone where complete cooling and crystallization takes place and where the crystallized solid can be easily removed.

In carrying out my invention the crude oxidation mixture containing quinone is vaporized by steam using proportions of steam such that the quinone can be readily crystallized by cooling to about room temperature. However, the proportion of steam should not be so small that the quinone is present in such large amounts that it is not substantially completely soluble in the condensed water at the elevated temperature of the hot condenser. It is desirable to use those amounts of steam which enable condensation at between 60–90° C. without substantial crystallization of the quinone taking place. When operating the hot condenser at these temperatures, the steam should be used in amounts of 10–25 lbs. per pound of quinone. It is apparent that any proportions of steam to quinone can be used, which enable condensation at an elevated temperature without crystallization and which at the same time enable crystallization to take place on cooling to substantially room temperature. However, with excessively large proportions of steam a considerable amount of the quinone will remain in the solution even after chilling and will, therefore, substantially affect the economy of the process. On the other hand, if too small amounts of steam are used the temperature in the hot condenser must be so high in order to avoid crystallization that it approaches the boiling point of water and, therefore, inefficient condensation will take place. For these reasons I prefer to operate the hot condenser at temperatures between 70 and 85° C., especially 75 and 80° C., and use amounts of steam varying between 10 and 25 lbs. per pound of quinone and, especially, 12–20 lbs. The most economical proportion of steam to use when operating between 75 and 80° C. has been found to be about 20 lbs. per pound of quinone. The process can be carried out most efficiently when the crystallizing point of the solution resulting from the steam and vapor mixture, is as close as possible to the temperature of condensation without inducing crystallization. The final cooling is done immediately and rapidly in order to avoid decomposition of the product.

In order to enable a clear understanding of my invention I have illustrated diagrammatically in the accompanying drawing, apparatus in which my improved process can be carried out.

Referring to the drawing, reference numeral 1 designates a reservoir containing the material to be purified such as a crude reaction mixture of quinone obtained by oxidation of a benzene derivative which is introduced into the system through conduit 2 provided with valve 3. The contents of reservoir 1 are kept in suspension by pump 4 which withdraws liquid therefrom through conduit 5 and circulates it through conduit 6 to overflow 7 and conduit 8 back into the oxidation reservoir 1. From line 6, portions of the oxidation mixture are continuously withdrawn through conduit 9, valve 10, and feed glass 11 and introduced into the upper portion of stripping column 12 which is of conventional design. The lower portion of column 12 is provided with a vapor line 17 communicating with boiler 13 which supplies a source of steam to the stripping column. Conduit 15, communicating with the bottom of stripping column 12 and with boiler 13, serves to convey reflux and undistilled residue into boiler 13 from which it may be periodically removed through valve 20. The ascending steam entrains quinone and the vapor mixture passes through conduit 21 into the hot condenser 22 provided with conduits 31 and 32 for introduction and withdrawal of a cooling fluid. Warm or hot liquid condensate is conveyed by conduit 23 provided with sight glass 24 into cooler 25. Cooler 25 is provided with an external cooling jacket 26 having conduits 27 and 28 for introduction and removal of a cooling fluid such as cold brine. It is also provided internally with a screw conveyer 29 driven by sprocket 30. Solids which are precipitated in cooler 25 and the mother liquor are forced by the action of the screw conveyer 29 into centrifuge 35 where separation of crystallized quinone from the mother liquor takes place by centrifugal action. Crystallized quinone is periodically removed from the centrifuge and the mother liquor is returned to the stripping column.

In operation the crude oxidation mixture containing quinone is introduced into reservoir 1 through valve 3 in conduit 2. Valve 3 is then closed and circulating pump 4 put into operation in order to maintain the quinone in suspension in feed tank 1. Steam is introduced into 13 through conduit 16 and travels through 17 and up through stripping column 12. From circulating line 6 the oxidation mixture is withdrawn through conduit 9 and feed glass 11 and introduced into the stripping column at such a rate that there will be a ratio of preferably about 12–20 lbs. of steam per pound of quinone passing out of the vapor line 21 to the condenser 22. Condenser 22 is maintained at a temperature such that condensation takes place but that crystallization is avoided. With these proportions of steam the temperature of condenser 22 should be between about 75 and 80° C. The hot condensed liquid is rapidly conveyed into cooler 25 where complete crystallization and rapid cooling takes place. Solids deposited are continuously forced by conveyer 29 into the centrifuge 35 where separation of crystalline quinone from the liquid takes place. Mother liquor separated in the centrifuge is returned to the stripping column in order to effect complete recovery of the small amount of quinone soluble therein.

It is apparent that many widely different variations and changes can be made in the above described apparatus without departing from the spirit or scope of my invention. For instance, other means than centrifugal force for separating liquid from solids such as precipitation, filtration, etc. may be employed. Also instead of employing a final cooler provided with a screw conveyor it is possible to use a cooler of any type or size from which the solids can be intermittently or continuously removed. If desired a mechanical stirrer may be used to completely maintain the contents of the oxidation feed tank in suspension. The conduit between the condenser and the cooler should preferably be of substantial size in order to enable rapid flow of the condensate into the cooler and avoidance of decomposition at the higher temperature.

Due to the difficulty in handling quinones, their chemical properties, and their instability, my process is especially useful in purifying compounds of this class. However it is apparent that organic compounds which are solid at room temperature and are substantially insoluble in water at low temperatures, but substantially soluble in water at elevated temperatures can be purified in the same manner. Examples of such materials are xyloquinone, toluquinone, aminobenzoic acid and p-hydroxy cinnamic acid. My improved process is furthermore applicable to the purification of quinones prepared by oxidation of aromatic compounds, such as benzene and its derivatives, whether by electrolytic, catalytic or chemical oxidation. Quinones are most generally prepared by oxidation of benzene derivatives with various chemical oxidizing agents, for instance oxidation of hydroquinone, aniline, p-phenol sulfonic acid, diazoamido benzene and benzidine with oxidizing agents such as manganese dioxide and sulfuric acid or sodium bichromate and sulfuric acid. I have found that my process is particularly suitable for the purification of quinones contained in such crude reaction mixtures.

Although I prefer to carry my process out at substantially atmospheric pressure, it is possible to employ a vacuum as low as 24 to 27 inches of mercury, or super-atmospheric pressure if desired.

The herein described invention constitutes a simple and economical method of purifying solid organic substances such as quinone. It has been found that by operating in the manner described substantial decomposition of quinone during distillation is avoided, especially decomposition which has heretofore been caused by incomplete or slow cooling due to inefficiency of condensers. An outstanding advantage of my invention is that a troublesome deposition of solids on condensing surfaces during steam distillation and resultant necessity for dismantling apparatus is avoided. My process furthermore enables the substantially automatic purification of substances having noxious or toxic properties such as quinones, without requiring exposure of personnel to their action. The quinone produced in accordance with my process is of excellent purity and is suitable for use without further treatment.

What I claim as new and desire to be secured by Letters Patent of the United States is:

1. The process which comprises subjecting a mixture containing quinone to steam distillation, condensing the distillate at a temperature above that at which crystallization of quinone in the condensate takes place and conveying the hot or warm condensate to a cooling zone where cooling to a temperature below the crystallizing point takes place, the steam employed in the distillation being used in such amounts that the quinone is soluble in the condensate at the temperature of condensation but is substatnially insoluble at the temperature of the final cooling zone.

2. The process which comprises subjecting a crude oxidation mixture containing quinone to steam distillation, the steam being used in amounts such that 10–25 lbs. of steam per lb. of quinone occurs in the distillate, cooling the distillate to a temperature above that at which crystallization takes place, but below that at which liquefaction is obtained and conveying the liquid condensate to a cooling zone where complete cooling and crystallization takes place.

3. The process which comprises subjecting a mixture containing quinone to steam distillation, the steam being used in amounts such that 10 to 25 lbs. of steam per lb. of quinone occurs in the distillate, cooling the distillate to between about 60° and 90° C. and conveying the condensate to a cooling zone where cooling and crystallization of the quinone takes place.

4. The process which comprises subjecting a mixture containing quinone to steam distillation, the steam being used in amounts such that about 12–20 lbs. of steam per lb. of quinone occurs in the distillate, condensing the distillate at a temperature between about 75 and 80° C. and then conveying the liquid condensate to a cooler where complete cooling and crystallization takes place.

5. The process which comprises subjecting a mixture containing quinone to steam distillation, the steam being used in amounts such that about 20 lbs. of steam per pound of quinone occurs in the distillate, condensing the distillate at a temperature of about 75 to 80° C. and then conveying the liquid condensate to a cooler where cooling and crystallization of the quinone occurs.

6. The process which comprises subjecting an oxidation mixture containing quinone obtained by the oxidation of anilin with manganese dioxide and sulfuric acid to steam distillation, the steam being used in such amounts that a distillate containing about 20 lbs. of steam per lb. of quinone is obtained, condensing the distillate at a temperature between 75 and 80° C., conveying the hot liquid condensate to a cooling zone where it is cooled to about room temperature, separating the crystallized quinone from the mother liquor and recycling the latter to the steam distillation step.

7. The process which comprises subjecting a mixture containing quinone to steam distillation, condensing the distillate at a temperature above that at which crystallization of quinone in the condensate takes place and conveying the hot or warm condensate to a means in which the quinone is continuously separated from the condensate, the steam employed in the distillation being used in such amounts that the quinone is soluble in the condensate at the temperature of condensation.

JOHN W. ZABRISKIE.